(12) United States Patent
Tamaoki

(10) Patent No.: US 8,411,710 B2
(45) Date of Patent: Apr. 2, 2013

(54) LASER APPARATUS

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 105 days.

(21) Appl. No.: 13/160,172

(22) Filed: Jun. 14, 2011

(65) Prior Publication Data

US 2011/0317726 A1    Dec. 29, 2011

Related U.S. Application Data

(60) Provisional application No. 61/359,032, filed on Jun. 28, 2010.

(51) Int. Cl.
*H01S 3/10* (2006.01)
(52) U.S. Cl. ......... 372/25; 372/26; 372/29.014; 372/30; 372/69
(58) Field of Classification Search .............. 372/25–26, 372/29.014, 30
See application file for complete search history.

(56) References Cited

U.S. PATENT DOCUMENTS

| 5,867,305 A | 2/1999 | Waarts et al. |
| 2010/0177797 A1 | 7/2010 | Appleyard et al. |
| 2010/0260216 A1* | 10/2010 | Tamaoki ................. 372/25 |
| 2011/0122895 A1* | 5/2011 | Savage-Leuchs et al. ...... 372/10 |
| 2012/0206794 A1* | 8/2012 | Fermann et al. ............ 359/341.3 |

FOREIGN PATENT DOCUMENTS

| EP | 1 734 622 A1 | 12/2006 |
| WO | WO-2009/007721 A2 | 1/2009 |

* cited by examiner

*Primary Examiner* — Dung Nguyen
(74) *Attorney, Agent, or Firm* — Venable LLP; Michael A. Sartori

(57) ABSTRACT

The present invention relates to a laser apparatus with a structure for realizing a fast response in carrying out a start and an end of output of pulsed laser light while effectively suppressing damage to an optical amplifying medium. The laser apparatus is provided with a seed light source, an optical amplification section, a pulse modulator, a pump power controller, and a main controller. The pulse modulator receives an output start instruction and an output end instruction fed from the main controller and controls a start and an end of output of seed light from the seed light source. The pump power controller receives a pump trigger signal fed from the main controller and increases or decreases a power of pump light supplied to the amplification section. The main controller decreases the power of the pump light supplied to the amplification section, on the occasion of ending the output of the pulsed laser light, and thereafter makes the pulse modulator end the output of the seed light from the seed light source.

7 Claims, 14 Drawing Sheets

LASER APPARATUS

CROSS REFERENCE TO RELATED APPLICATIONS

This application claims priority to Provisional Application No. 61/359,032 filed on Jun. 28, 2010 by the same Applicant, which is hereby incorporated by reference in its entirety.

BACKGROUND OF THE INVENTION

1. Field of the Invention

The present invention relates to a laser apparatus configured to amplify pulsed seed light and output amplified pulsed laser light.

2. Related Background Art

A laser apparatus of a MOPA (Master Oscillator Power Amplifier) configuration with a seed light source and an optical amplification section is configured to amplify seed light output from the seed light source in the optical amplification section and output the amplified light.

The optical amplification section to be preferably used is, for example, a configuration including an optical fiber with a core doped with a rare earth element (e.g., Yb, Er, Nd, Tm, Ho, Tb, or the like), as an optical amplifying medium. When the rare earth-doped optical fiber is used as an optical amplifying medium, there are many advantages, e.g., easy handling because of confinement of the pump light and laser light in the optical fiber, no need for large-scale cooling equipment because of good heat radiation, and so on.

Yb (ytterbium) among the rare earth elements as a dopant in the optical fiber as an optical amplifying medium has a high conversion efficiency. For this reason, the Yb-doped optical fiber is widely used as an amplification optical fiber for high power. Like the other rare earth elements, Yb is also excited with supply of pump light and the remaining pump light not absorbed is output from the other end of the amplification optical fiber.

FIG. 5 in U.S. Pat. No. 5,867,305 discloses the configuration to inject a pulse of pump light and to make a coincidence between an end of the pulsed pump light and an end of an individual injected signal (seed light) pulse. In this configuration, individual pulses of injected signal (seed light) correspond to respective pulses of pump light. U.S. Pat. No. 5,867,305 discloses nothing about adjustment of output of the pump light at a time of switching of the seed light from pulse operation to CW operation.

SUMMARY OF THE INVENTION

The inventor conducted research on the aforementioned conventional technology and found the following problem.

Specifically, the laser apparatus of the MOPA configuration can obtain the pulsed laser light with high power and high quality. For this reason, there are increasing demands for the laser apparatus of the MOPA configuration in applications such as processing and medical use. In such applications, a workpiece includes portions to be processed with irradiation of the laser light of continuous repetitive pulses, and portions not to be processed, without irradiation of the laser light. In such cases, it is necessary to start the output of the pulsed laser light from the laser apparatus at a certain time and to end the output at another certain time. There are routine works with the start time and the end time determined, and there are also cases where the irradiation location and irradiation time of the laser light are determined on an as-needed basis while measuring a workpiece. In either case, the laser apparatus is required to permit an instantaneous change between irradiation and termination of the laser beam. However, the laser processing becomes more difficult with increase in speed in such an operation that during a process of continuous irradiation with repetitive pulses (or in a pulse operation state), the laser irradiation state is quickly switched into a disabled state of laser processing and after a while, the laser apparatus is quickly switched again into an enabled state of laser processing, and there are many proposed methods.

The inventor proposes, as a basic configuration, such processing that the seed light source is subjected to direct modulation control in the optical fiber laser apparatus of the MOPA configuration in order to settle the aforementioned difficulty of fast switching, whereby the workpiece is irradiated with continuous pulsed light of a recurrence frequency (which will be referred to hereinafter as repetitive light pulses) (to apply the laser light in the pulse operation state) to be processed thereby. The irradiation with the laser in the pulse operation state is stopped at a portion of the object that does not have to be processed, and instead, the laser is applied thereto in a CW operation state, thereby realizing a non-processing state. By quick switching between the CW operation and the pulse operation of repetitive light pulses, it becomes feasible to achieve fast switching between the processing state and the non-processing state. However, the inventor discovered a new problem in this method that at the time of the switching from the pulse operation to the CW operation, a phenomenon of breakage of the amplification optical fiber in the MOPA configuration could occur.

The present invention has been accomplished in order to solve the above problem and it is therefore an object of the present invention to provide a laser apparatus with a structure for realizing a fast response in execution of a start and an end of output of pulsed laser light while effectively suppressing the damage to an optical amplifying medium.

A laser apparatus according to the present invention comprises a seed light source, a pumping source, an optical amplification section, a pulse modulator, a pump power controller, and a main controller. The seed light source is able to output either of pulsed light and CW light as seed light. The pumping source outputs CW light as pump light. The optical amplification section receives the pump light and the seed light, and amplifies the seed light. The pulse modulator modulates the seed light source into an operation state of either a repetitive pulse operation state or a CW operation state. The pump power controller adjusts a power of the pump light fed to the optical amplification section. The main controller outputs a signal to indicate a timing of control in the pulse modulator and the pump power controller. Particularly, the pump power controller decreases the power of the pump light output from the pumping source to below a predetermined power in a duration in which the pulse modulator maintains the seed light source in the repetitive pulse operation state, prior to a switching timing of the seed light from the pulsed light to the CW light at a light entrance end of the optical amplification section, based on a timing of the signal output from the main controller.

A duration from a timing of an external instruction for switching of the operation state in the seed light source from the repetitive pulse operation state to the CW operation state (a fall time of an external trigger voltage in the external modulator) to a timing of an actual transition of the seed light source from the repetitive pulse operation state to a steady state of the CW operation state is defined as a switch control duration. During this switch control duration, the pump power controller performs a power decrease and a power increase of the CW pump light. The actual switching from the repetitive pulse operation state to the CW operation state in the seed light source is carried out between the timing of the power decrease and the timing of the power increase of the pump light by the pump power controller. The power increase timing of the CW pump light is approximately coincident with the timing when the operation state of the seed light source moves into the steady state of CW operation.

In the laser apparatus according to the present invention, the pump power controller preferably increases or decreases the power of the pump light supplied to an optical amplifying medium, by directly controlling the output power of the pumping source. Alternatively, the laser apparatus may further comprise a variable optical attenuator arranged on an optical path between the pumping source and the optical amplification section. In this configuration, the pump power controller controls the variable optical attenuator to increase or decrease the power of the pump light supplied to the optical amplifying medium.

In the laser apparatus according to the present invention, the predetermined power of the pump light in the switching of the seed light from the repetitive pulse operation state to the CW operation state in the optical amplification section is preferably a pump power at which a gain of ASE light in the optical amplifying medium becomes less than a gain of the CW light.

In the laser apparatus according to the present invention, the main controller preferably comprises a timing difference adjuster for adjusting a timing difference so as to inject the pump light at the predetermined power, on the occasion of input of a rising part of the CW light of the seed light into the optical amplification section.

In the laser apparatus according to the present invention, the pump power is preferably set stepwise toward a power in a CW oscillation operation, after reaching the predetermined power on the occasion of switching of the seed light from the repetitive pulse operation state to the CW operation state in the optical amplification section. In the laser apparatus according to the present invention, the main controller preferably includes the pump power controller.

DESCRIPTION OF THE PREFERRED EMBODIMENTS

Embodiments of the laser apparatus according to the present invention will be described below in detail with reference to FIGS. 1, 2A-4D, 5, 6A-8D, 9, 10A-10C, and 11 to 14. In the description of the drawings the same portions and the same elements will be denoted by the same reference signs, without redundant description.

Figure 1:
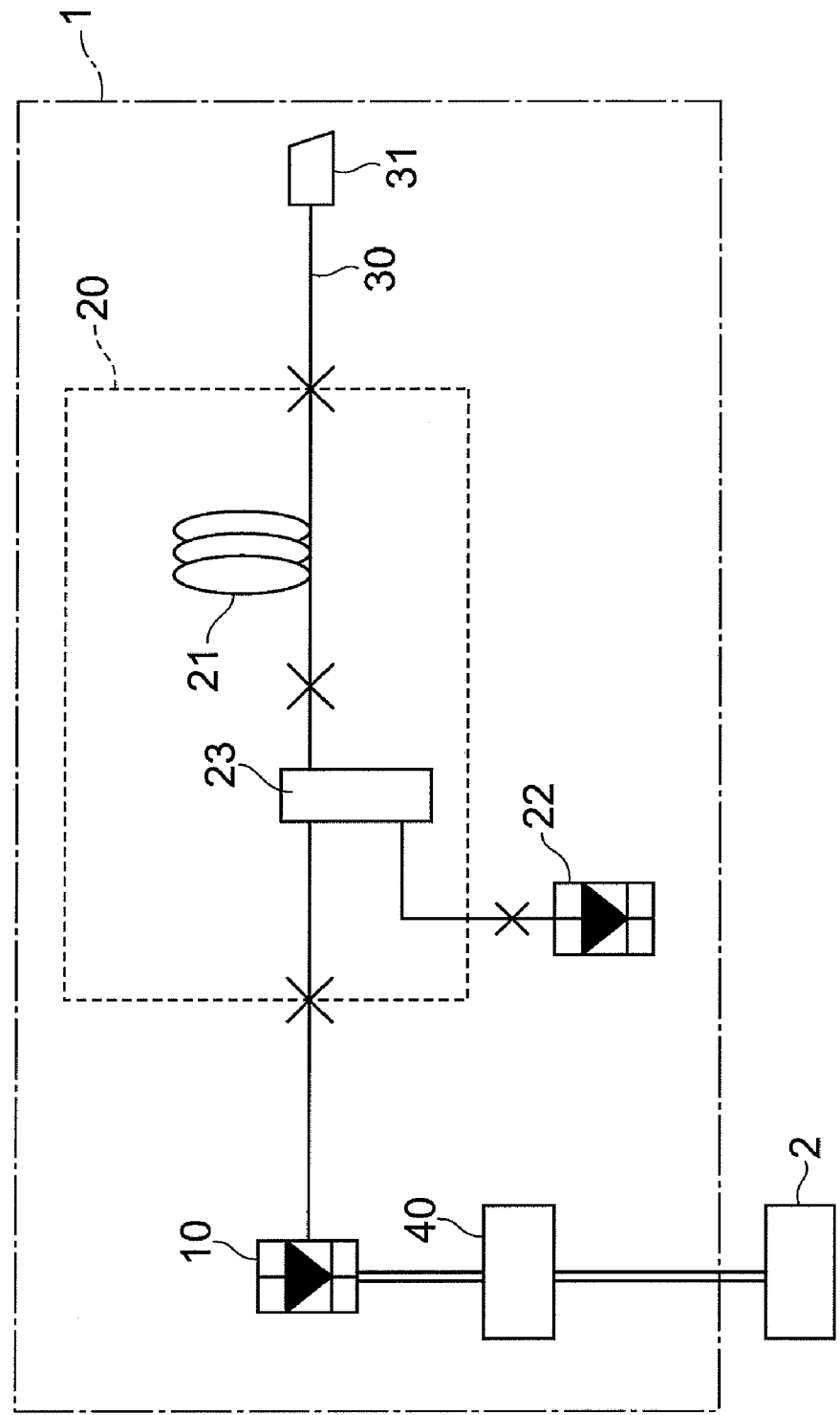
FIG. 1 is a drawing showing a configuration of a laser apparatus according to a comparative example.
Figure 2:
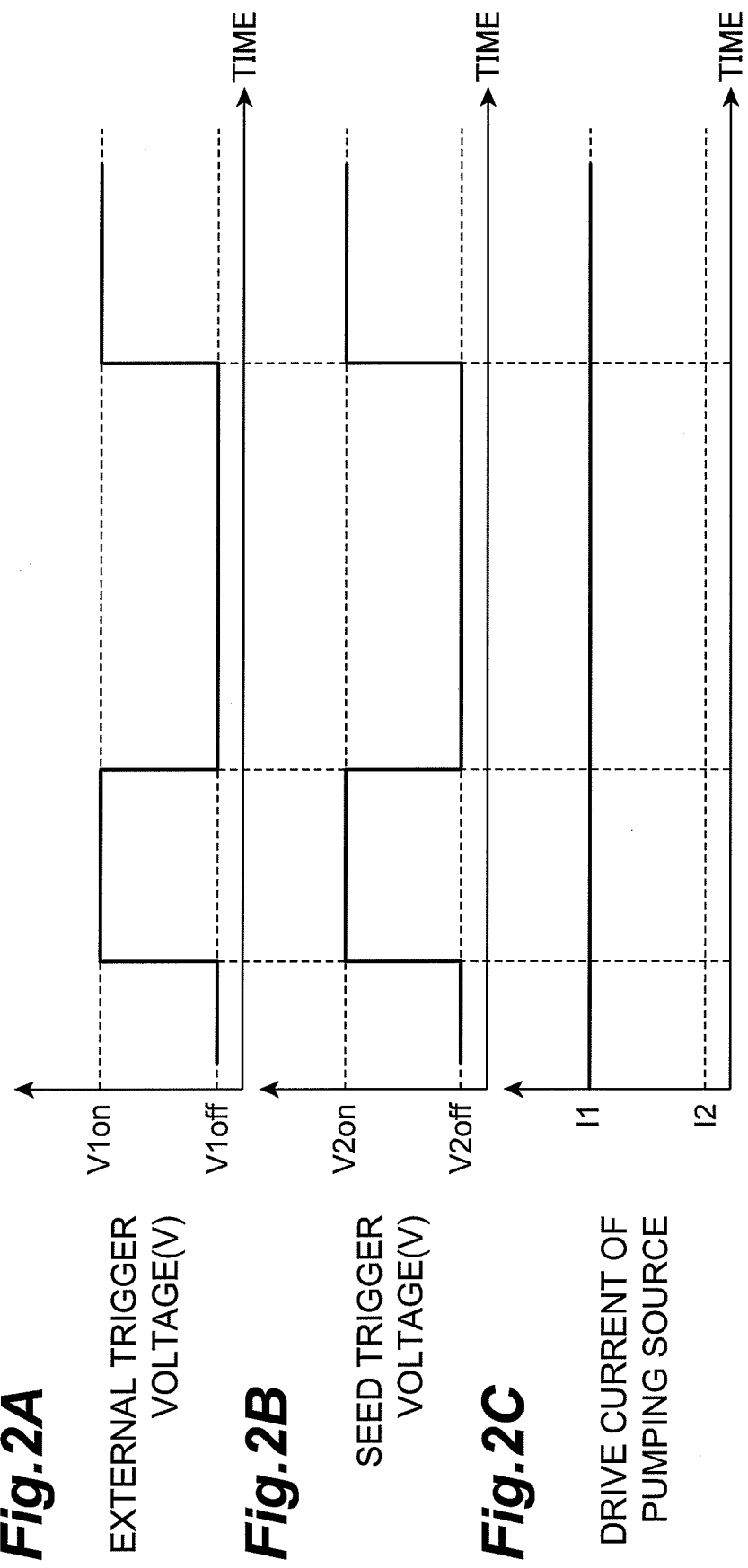
FIGS. 2A to 2C are timing charts showing respective signals in the laser apparatus of the comparative example.
Figure 3:
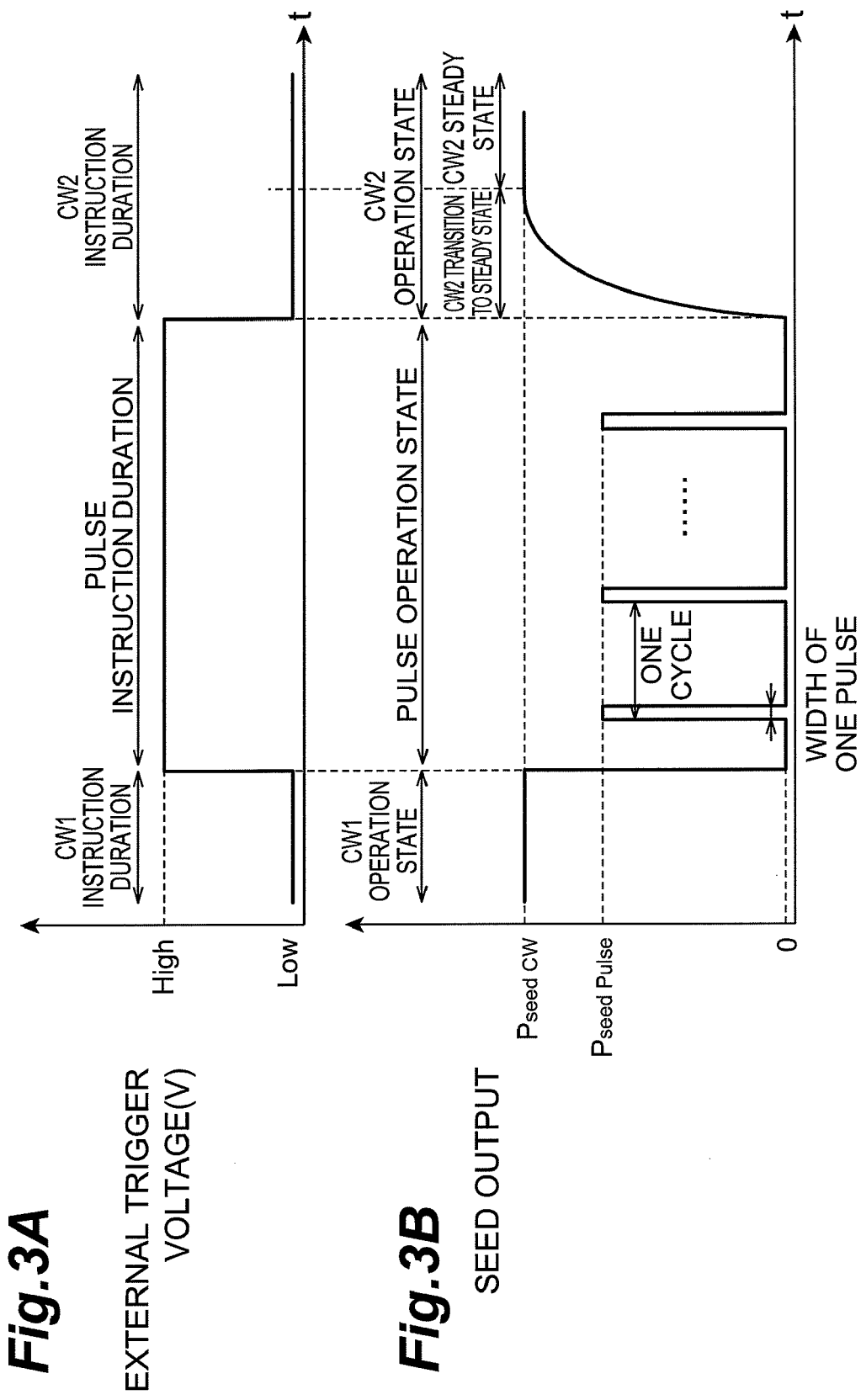
FIGS. 3A and 3B are timing charts showing an operation example of control of a seed light source and output from the seed light source.
Figure 4:
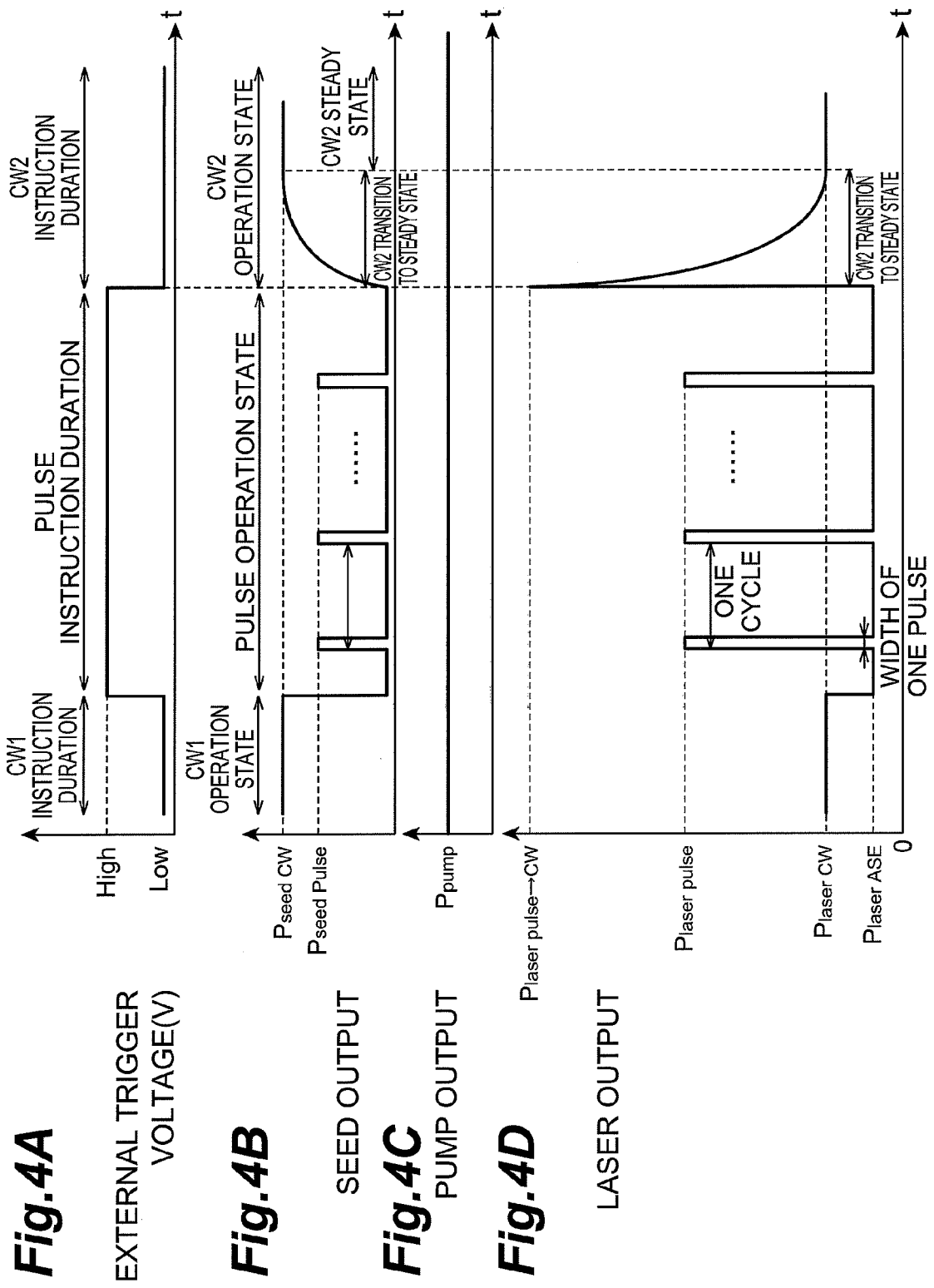
FIGS. 4A to 4D are timing charts showing an operation example of output from the seed light source and output from the laser apparatus.

FIG. 1 is a drawing showing a configuration of a laser apparatus according to a comparative example. The laser apparatus 1 of the comparative example shown in FIG. 1 is provided with a seed light source 10, an optical amplification section 20, a delivery optical fiber 30, and a pulse modulator 40 and is used in combination with an external trigger generator 2.

The seed light source 10 has a structure for repetitively outputting pulsed seed light and, for example, it repetitively outputs the pulsed seed light through direct modulation of output from a laser diode. The seed light source 10 starts the output of seed light in response to an output start instruction given from the pulse modulator 40 and ends the output of seed light in response to an output end instruction given from the pulse modulator 40.

The optical amplification section 20 includes an amplification optical fiber 21 as an optical amplifying medium and an optical multiplexer (e.g., optical coupler) 23. A pumping source 22 outputs pump light. The optical multiplexer 23 receives the seed light fed from the seed light source 10 and outputs the seed light into the amplification optical fiber 21, and the multiplexer 23 also receives the pump light fed from the pumping source 22 and supplies the pump light into the amplification optical fiber 21. The amplification optical fiber 21 is excited by the pump light to amplify the seed light. Thereafter, amplified pulsed laser light is output from the amplification optical fiber 21.

The amplification optical fiber 21 preferably has a double clad type refractive-index profile. In this case, the amplification optical fiber 21 has a core part doped with a rare earth element, a first cladding part surrounding this core part and having the refractive index lower than that of the core part, and a second cladding part surrounding this first cladding part and having the refractive index lower than that of the first cladding part. The core part of the amplification optical fiber 21 guides the seed light in a single mode, and the core part and the first cladding part guide the pump light in multiple modes.

Absorption of the pump light in the amplification optical fiber 21 is determined by characteristics of the amplification optical fiber 21 (mainly, the mode field diameter, the outside diameter of the first cladding part, and a rare-earth doping concentration of the core part). For example, in the case of the amplification optical fiber with the core part doped with Yb as a rare earth element (which will be referred to hereinafter as YbDF), where the Yb doping concentration is about 10000 ppm, the mode field diameter about 7 µm, the outside diameter of the first cladding part about 130 µm, and the length 5 m, the pump light of about 2.4 dB is absorbed in a 915 nm wavelength band of pump light. The wavelength of the pump light may be a 940 nm band or a 975 nm band. The amplification optical fiber 21 does not always have to be limited to YbDF, but an optical fiber doped with another rare earth element may also be employed depending on the intended use.

The laser apparatus 1 preferably includes a plurality of pumping sources 22 in order to obtain a high gain and in this case it is preferable to use an optical combiner as the optical multiplexer 23. The laser apparatus 1 may further comprise a single stage of intermediate optical amplification section or multiple stages of intermediate optical amplification sections between the seed light source 10 and the optical amplification section 20, in order to obtain a high power.

The delivery optical fiber 30 receives pulsed laser light output from the amplification optical fiber 21, at one end and outputs the pulsed laser light from an exit end 31. The delivery optical fiber 30 has a core part, and a cladding part surrounding this core part and having the refractive index lower than that of the core part, and guides the pulsed laser light in a single mode.

The pulse modulator 40 receives the output start instruction and output end instruction to provide external triggers (TTL signals), from the external trigger generator 2 and supplies these instructions to the seed light source 10. By this operation, the pulse modulator 40 controls a start and an end of a duration of oscillation of repetitive pulses, as the seed light output from the seed light source 10. The start instruction and end instruction of the duration given to the pulse modulator 40 may be provided manually, but it is preferable to provide them from the external trigger generator 2, in order to carry out the start and end of output at high speed in the seed light source 10. The external trigger generator 2 is, for example, a personal computer or the like provided inside or outside a main body of a processing device.

FIGS. 2A-2C are timing charts showing respective signals in the laser apparatus 1 of the comparative example. Specifically, FIG. 2A shows an external trigger voltage supplied from the external trigger generator 2 to the laser apparatus 1, FIG. 2B a seed trigger voltage supplied to the seed light source 10 on the basis of the external trigger voltage, and FIG. 2C a drive current of the pumping source supplied to the pumping source 22.

The external trigger voltage (FIG. 2A) supplied from the external trigger generator 2 to the laser apparatus 1 indicates a start of the output from the seed light source 10 by a transition from a low level V1off to a high level V1on and indicates an end of the output from the seed light source 10 by a transition from the high level V1on to the low level V1off.

The seed trigger voltage (FIG. 2B) supplied from the pulse modulator 40 to the seed light source 10 changes its levels at the same timing as the external trigger voltage (FIG. 2A) supplied from the external trigger generator 2 to the laser apparatus 1, indicates a start of the output from the seed light source 10 by a transition from a low level V2off to a high level V2on, and indicates an end of the output from the seed light source 10 by a transition from the high level V2on to the low level V2off. The drive current (FIG. 2C) of the pumping source supplied to the pumping source 22 is always kept at a high level I1 and indicates continuation of the output of pump light at a fixed intensity from the pumping source 22.

The seed light source 10 can select either pulse operation or CW operation in response to the seed trigger voltage (pulse pattern) from the pulse modulator. The behavior of either the CW operation or the pulse operation of the seed light source 10 exerts influence up to the final laser output in the MOPA case. The difference in laser output between the CW operation and the pulse operation is instantaneous output; in the CW operation, the output is always constant because of a continuous wave; in the pulse operation, energy is concentrated in a short period of one pulse. For this reason, the pulsed light output can have the output power of several thousand times that of the CW light output. By taking advantage of this characteristic, the CW light is output during periods in which no object is processed.

FIGS. 3A and 3B show the behaviors of the CW operation and the pulse operation in the seed light source 10. The seed light source 10 continuously generates a plurality of pulses during a predetermined duration, after CW operation. Thereafter, the seed light source 10 is shown so as to perform an operation returning to the CW operation. A power level in a steady state of the CW operation is set to an output according to a peak level of the pulse operation. This eliminates a work to adjust the peak level of the pulse operation on occasions of switching from the CW operation to the pulse operation, thereby enabling On/Off of laser processing.

Specifically, as shown in the timing chart of FIG. 3A, the first duration in which the external trigger voltage is at the Low level, is a CW1 instruction duration to make the seed light source 10 carry out the CW operation, and a duration in which the external trigger voltage is at the High level, subsequent to the CW1 instruction duration, is a pulse instruction duration to make the seed light source 10 carry out the pulse operation. Furthermore, a duration in which the external trigger voltage is at the Low level, subsequent to the pulse instruction duration, is a CW2 instruction duration to make the seed light source 10 carry out the CW operation.

On the other hand, as shown in the timing chart of FIG. 3B, the seed light source 10 is in a CW1 operation state to output the CW light with the power Pseed CW during the CW1 instruction duration. During the pulse instruction duration, the seed light source 10 is in a pulse operation state to repetitively output the pulsed light with the power Pseed Pulse. During the CW2 instruction duration, the seed light source 10 is in a CW2 operation state to again output the CW light with the power Pseed CW. The CW2 operation state turns into a CW2 steady state (a state of stable CW operation) through a transition duration (CW2 transition to steady state). During the transition duration, the output power is gradually brought back to the level in the steady state of the CW operation. The output wavelength of YbDF is 1060 nm in the pulse operation. During the CW operation on the other hand, YbDF oscillates at wavelengths except for 1060 nm because of self pulsation of ASE light (e.g., YbDF of a single clad type oscillates in a 1030 nm band and YbDF of a double clad type oscillates in a 1040-1050 nm band) and outputs the CW light with a stronger power than that of the fundamental wave of 1060 nm.

FIGS. 4A to 4D are timing charts showing an operation example in an output start period of the laser apparatus 1 of the comparative example where the seed light output control shown in FIGS. 3A and 3B is carried out. As shown in FIG. 4A, a start of output of pulsed light is indicated by a transition of the external trigger voltage from the Low level to the High level (transition from the CW1 instruction duration to the pulse instruction duration). At this time, the seed light source 10 starts the pulse operation of laser light after a lapse of a certain fixed delay period from the time of the output start instruction, as shown in FIG. 4B. Namely, the seed light source 10 switches from the output of CW light with the power Pseed CW (CW1 operation state) to the repetitive output of pulsed light with the power Pseed Pulse (pulse operation state). This delay period is determined by a time necessary before the external trigger voltage reaches a certain fixed level from the Low level and a time necessary for a required process for the pulse modulator 40 to give the output start instruction to the seed light source 10. Although there is a time necessary between the start of output of pulsed laser light and stabilization of intensity of pulsed laser light, the output of pulsed laser light is started in response to the output start instruction.

Furthermore, in FIG. 4A, the end of output of pulsed light, is indicated by a transition of the external trigger voltage from the High level to the Low level (transition from the pulse instruction duration to the CW2 instruction duration). At this time, the seed light source 10 starts stable output of the CW laser light with the power Pseed CW (CW2 steady state) after a lapse of a certain fixed transition duration (CW2 transition to steady state) from the time of the output end instruction, as shown in FIG. 4B. Namely, the seed light source 10 switches from the repetitive output of pulsed light with the power Pseed Pulse (pulse operation state) to the output of CW light with the power Pseed CW (CW2 operation state).

As described above, in the pulse operation state the seed light source 10 repetitively outputs pulses with a fixed pulse width in a fixed pulse period. When the external trigger voltage turns from the High level to the Low level (transition from the pulse instruction duration to the CW2 instruction duration), the seed light source 10 starts the CW operation to output the CW light after a lapse of the certain fixed delay time from the time of the output start instruction. In a rising part of this CW2 operation state, the output power level suddenly changes in a certain predetermined time (transition period) from the power level at the Off time of the repetitive pulse operation to the output power level in the steady state of the CW operation (CW2 steady state). FIG. 4C shows the output of pump light, the drive current of the pumping source is set at a constant level, and therefore the pump light power Ppump is constant.

Furthermore, FIG. 4D is a timing chart showing the laser output of the laser apparatus 1. The laser output means the output power based on voltage values obtained by photoelectric conversion when a photo-detector (not shown) receives the laser light from the light output end 31. In the steady state of CW operation, the laser output demonstrates a certain fixed power. When the seed light output (FIG. 4B) turns from the CW1 operation state into the pulse operation state (or when the optical power of the output laser light decreases from Plaser CW to Plaser ASE), the seed light power is the power of only ASE light in Off portions of single pulses and the output level thereof is a low level. Namely, these durations (Off periods of single pulses) are durations in which there is little consumption of the pump light so as to make the pump light power excessive. In a state in which a single pulse is ON, the single light pulse uses up the pump light power in the single-pulse Off state before it, as a gain and the pulsed light with the high peak power Plaser pulse is output as laser output. Furthermore, on the occasion of the transition from the pulse operation state to the CW2 operation state, the seed light power suddenly changes its output in the rising zone of the CW2 operation state, as described above, to shift into the CW steady state in the certain fixed time (the transition duration in FIG. 4B). It was confirmed that the laser output also suddenly changed in accordance therewith. Namely, at the beginning of the rising zone of the CW2 operation state, the laser output demonstrated a sudden increase similar to a transient response (with the peak power Plaser pulse→CW). After that, during a duration of the transition of the seed light power into the CW2 steady state, the laser output also gradually turns into the laser output during the CW steady operation.

In the CW2 steady state, the output is constantly given at a low power level (power Plaser CW in FIG. 4D) and usually no problem will arise in particular. During the repetitive pulse operation, the output is given at some peak power (power Plaser Pulse in FIG. 4D) for execution of laser processing, and the laser output is provided at an output level at which the optical amplification section is not broken. However, a pulse waveform of the pulsed laser light output last at the end of output has the high peak power of not less than two times and the wide bottom width of 1 μm, when compared to a pulse waveform of the other pulsed laser light before it. This is considered to be an influence by a pulsed portion of the seed light on the rising occasion of CW2 operation shown in FIG. 4B. It is presumed that the influence of this portion expanded the bottom width of the pulse and increased the peak power. It is also considered that because of the end of the pulse operation, the pump light not used for amplification of the seed light becomes ASE light to induce a situation of being likely to cause self pulsation and the peak power increases more by that degree. It was found that these factors led to generation of a giant pulse during the rising period (transition duration) of the CW2 operation state if the pump light power in the optical amplification section was large, and there was a risk of damage to the amplification optical fiber 21 and others. The laser apparatus of the embodiments described below provide a solution to this problem.

(First Embodiment)

Figure 5:
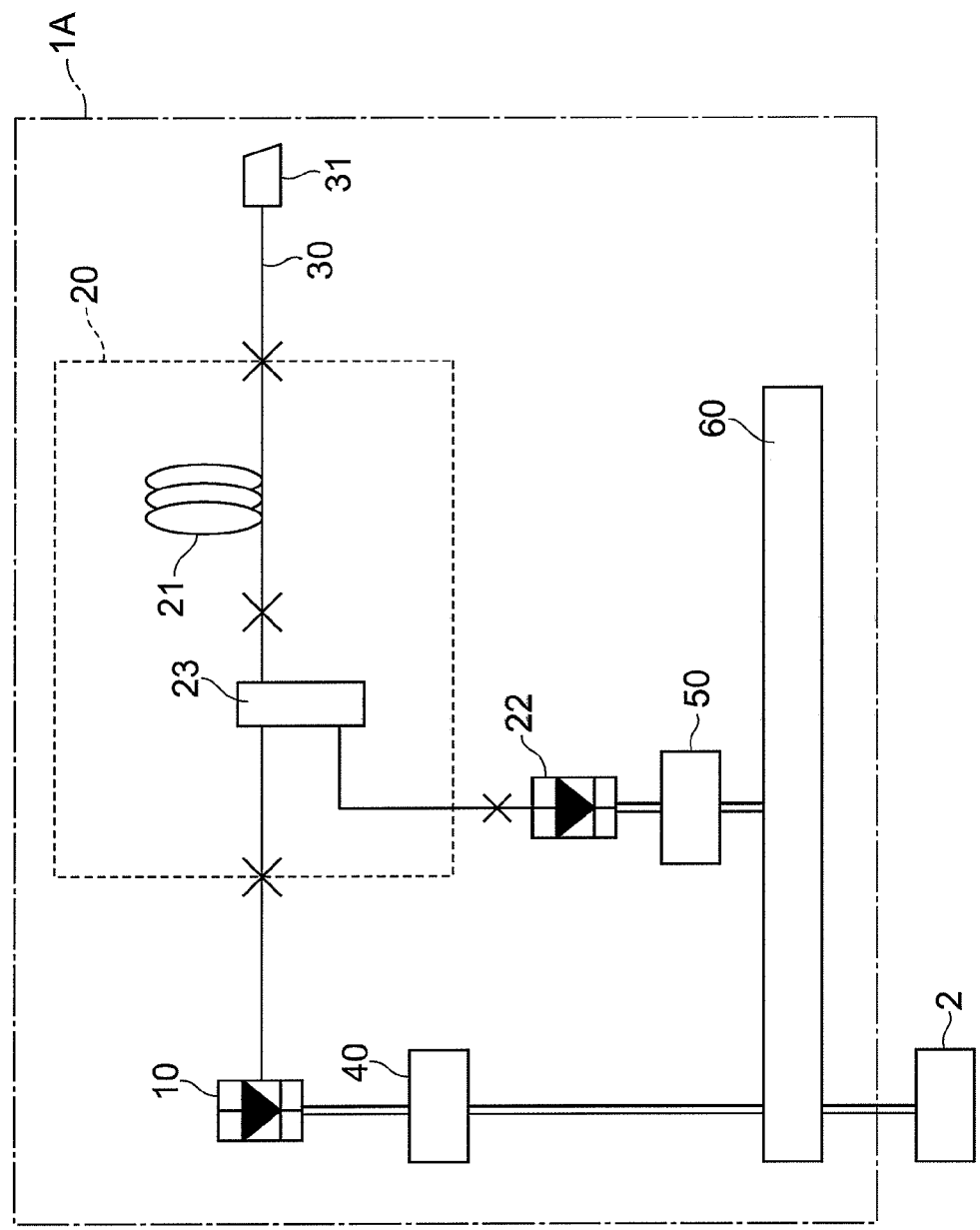
FIG. 5 is a drawing showing a configuration of the first embodiment of the laser apparatus according to the present invention.
Figure 6:
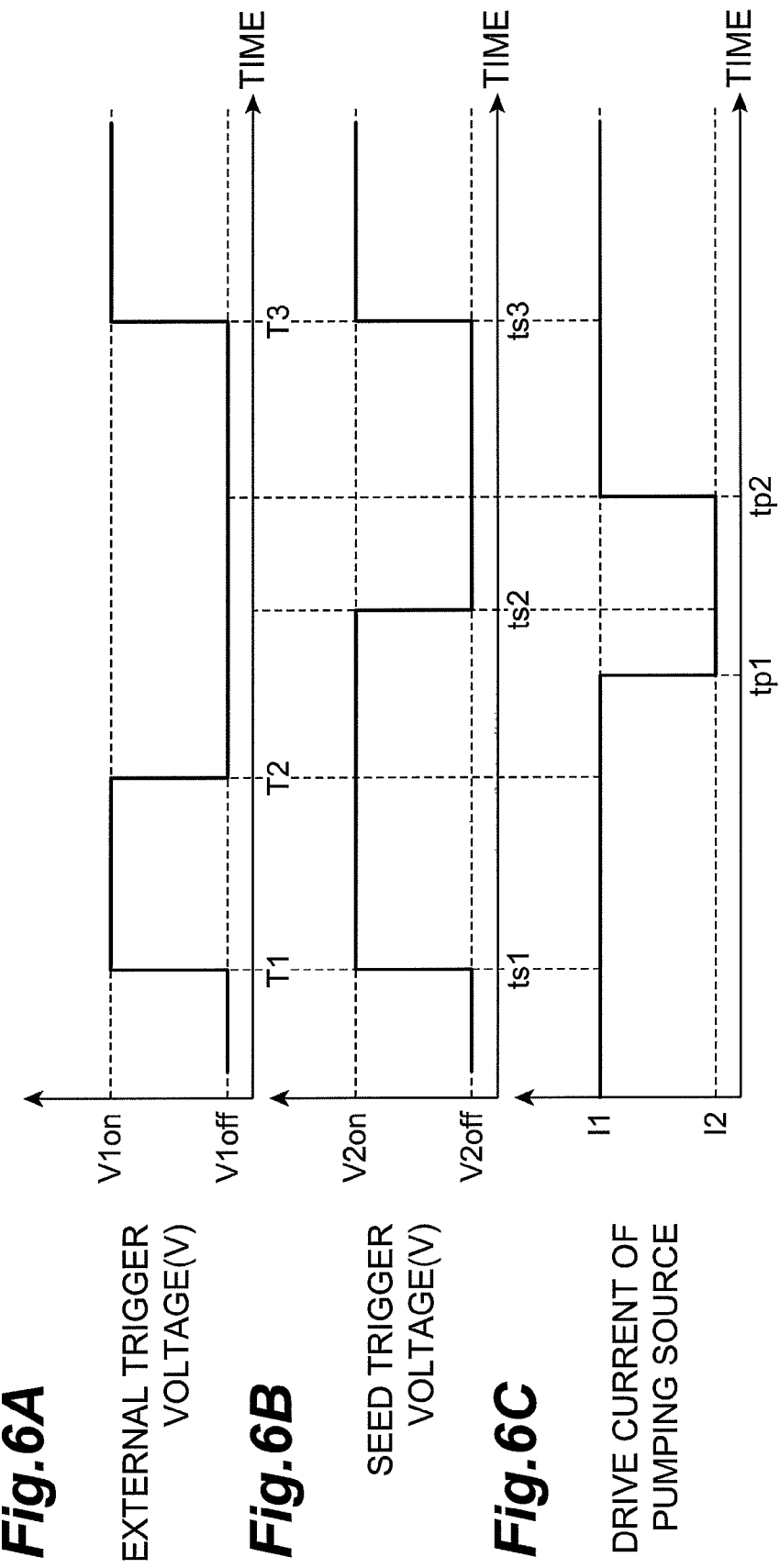
FIGS. 6A to 6C are timing charts showing respective signals in the laser apparatus 1A of the first embodiment.
Figure 7:
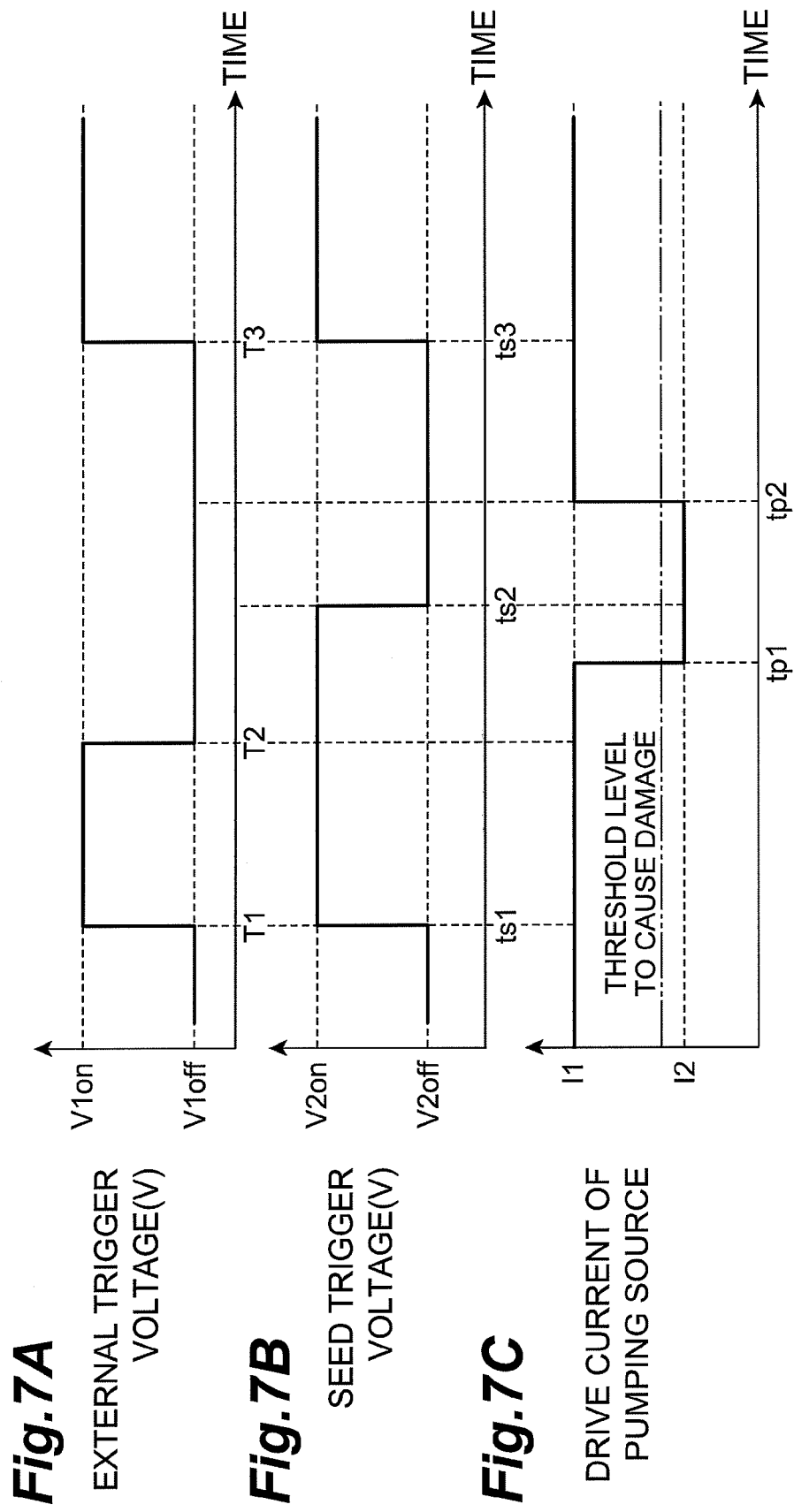
FIGS. 7A to 7C are timing charts showing respective signals in the laser apparatus 1A of the first embodiment.
Figure 8:
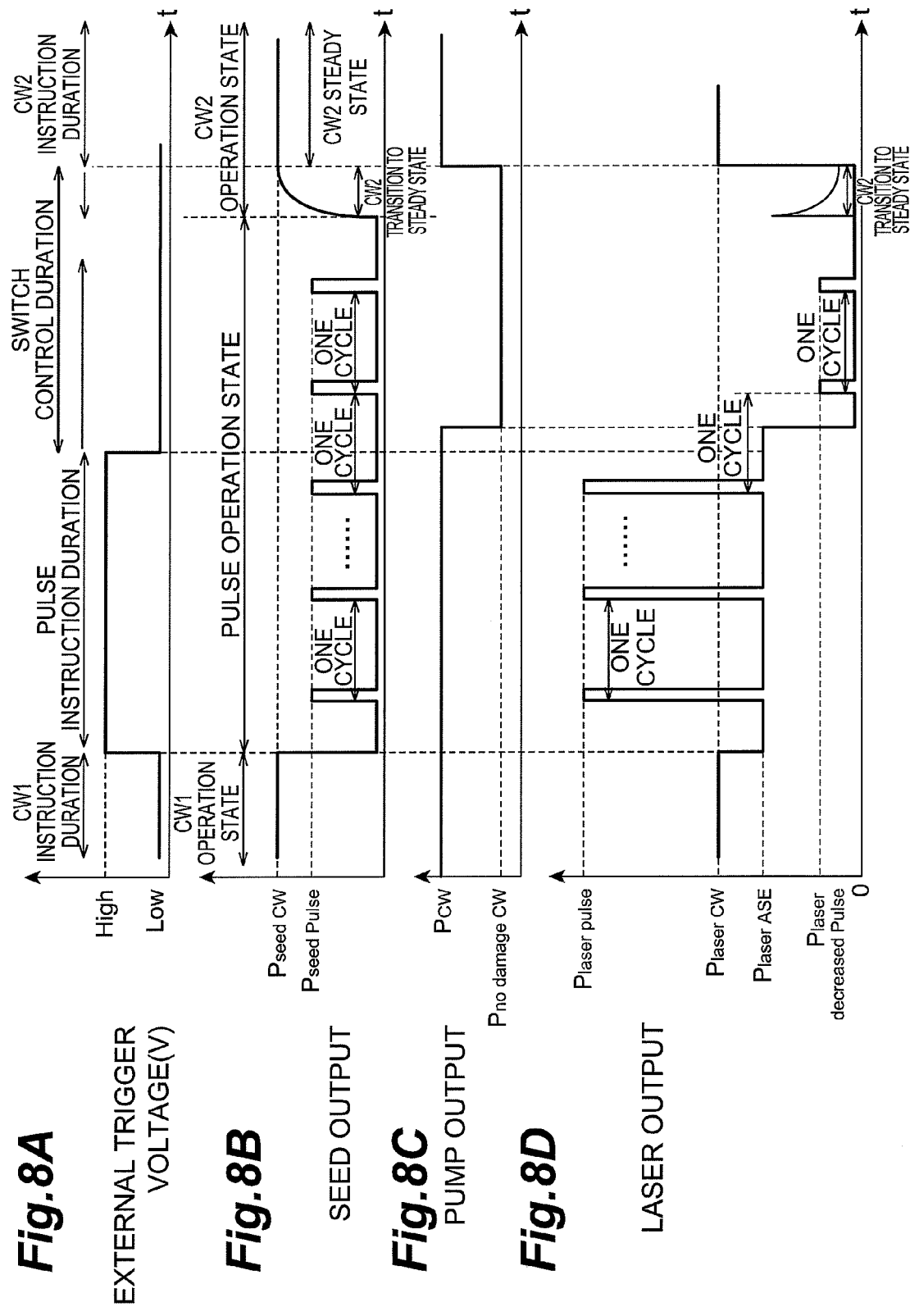
FIGS. 8A to 8D are timing charts showing an operation example of output from the laser apparatus 1A of the first embodiment.

FIG. 5 is a drawing showing a configuration of the laser apparatus 1A according to the first embodiment. This laser apparatus 1A shown in FIG. 5 is provided with the seed light source 10, the optical amplification section 20, the pumping source 22, the delivery optical fiber 30, the pulse modulator 40, a pump power controller 50, and a main controller 60, and is used in combination with the external trigger generator 2. When compared to the configuration of the laser apparatus 1 of the comparative example shown in FIG. 1, the laser apparatus 1A of the first embodiment shown in FIG. 5 is different in further comprising the pump power controller 50 and main controller 60. The pump power controller 50 may be arranged separately from the main controller 60 or may be included in the main controller 60 in order to achieve downsizing and increase in operation speed.

The pulse modulator 40 receives a start instruction and an end instruction of a duration of oscillation of pulses according to a recurrence frequency supplied from the main controller 60 and sends these instructions to the seed light source 10 to control a start and an end of output of the seed light from the seed light source 10. Specifically, the seed light source 10 ends the CW output in response to the start instruction and starts the output of repetitive pulses. In response to the end instruction, the seed light source 10 ends the repetitive pulse output and starts the CW output. The pump power controller 50 receives a pump trigger signal supplied from the main controller 60 and controls increase/decrease in power of the pump light output from the pumping source 22, based on this pump trigger signal. Namely, the pump power controller 50 controls the drive power of the pumping source 22, thereby increasing or decreasing the power of the pump light supplied to the amplification optical fiber 21.

The main controller 60 receives an output start instruction and an output end instruction of repetitive pulses supplied from the external trigger generator 2 and, based on these instructions, it gives instructions to each of the pump power controller 50 and the pulse modulator 40 in accordance with a predetermined procedure on occasions of starting and ending output of repetitive pulses. At a start of output of repetitive light pulses, the main controller 60 controls the pulse modulator 40 so as to start the output of the seed light from the seed light source 10 in the same manner as in the comparative example.

On the other hand, at an end of output of repetitive light pulses, the main controller 60 controls the pump power controller 50 to lower the power of the pump light supplied to the amplification optical fiber 21 and thereafter controls the pulse modulator 40 to end the output of repetitive pulses of seed light from the seed light source 10. After that, the main controller 60 controls the pump power controller 50 to return the power of the pump light supplied to the amplification optical fiber 21, to the original level, for a next output start instruction.

FIGS. 6A to 6C are timing charts showing respective signals in the laser apparatus 1A of the first embodiment. FIG. 6A shows the external trigger voltage from the external trigger generator 2, FIG. 6B the seed trigger voltage from the main controller 60 to the pulse modulator 40, and FIG. 6C the drive current of the pumping source based on the pump trigger signal from the main controller 60 to the pump power controller 50. FIGS. 7A to 7C also show timing charts showing respective signals in the laser apparatus 1A according to the first embodiment, but these timing charts are a modification example of the timing charts shown in FIGS. 6A to 6C. Specifically, FIGS. 7A and 7B are coincident with FIGS. 6A and 6B, but only the timing chart shown in FIG. 7C is different from the timing chart shown in FIG. 6C.

The external trigger voltage fed to the main controller 60 turns from the Low level V1off to the High level V1on at a time T1 or T3. This level change causes the seed trigger voltage to turn from the Low level V2off to the High level V2on at a time ts1 or ts3 (to indicate a start of repetitive light pulses from the seed light source 10). Similarly, when the external trigger voltage turns from the High level V1on to the Low level V1 off at a time T2, an end of output of repetitive light pulses from the seed light source 10 is indicated at a time ts2 (to turn the seed trigger voltage from the High level V2on to the Low level V2off). Namely, the time ts1 and the time ts3 are set based on the time T1 and the time T3, respectively.

With regard to the pump trigger signal, when the external trigger voltage turns from the High level V1 on to the Low level V1 off at the time T2, the drive current of the pumping source turns from the High level I1 to the Low level I2 at a time tp1 and further turns from the Low level I2 to the High level I1 at a time tp2 after a lapse of a short time from the time tp1. Namely, the time tp1 and the time tp2 are set based on the time T2.

The timing relationship between the seed trigger voltage and the drive current of the pumping source 22 is determined in an order of the times ts1, tp1, ts2, tp2, and ts3 in FIGS. 6A to 6C. The timing charts of FIGS. 6A to 6C are charts based on the premise that there is no timing difference between inputs of the pump light and seed light into the optical amplification section 20. If there is a timing difference, the timing difference is set so as to complement it. If this timing is assumed to be different from actual timing in the laser apparatus 1A, a further timing difference will be set. For example, in a case where two or more stages of auxiliary optical amplification sections are added between the seed light source 10 and the optical amplification section 20, a slight timing difference will arise. In that case, the timing will be adjusted by adding a timing difference setter described below.

The Low level I2 of the drive current of the pumping source 22 may be a level at which no pump light is output at all from the pumping source 22. The Low level of the drive current of the pumping source 22 can be such a level below a certain threshold level Ith that there is no damage to the amplification optical fiber 21 and others as described above (cf. FIG. 7C). Namely, the point herein is that the pump power controller 50 lowers the power of the pump light supplied to the amplification optical fiber 21 so as to make the gain of ASE light in the amplification optical fiber 21 smaller than the gain of the seed light, at the end of the output of repetitive light pulses.

On the occasion of switching the operation of the seed light source 10 from the pulse operation to the CW operation, the output of the seed light source can be in a condition of output lower than the normal CW output as shown in FIG. 3B. For this reason, the gain of ASE light becomes larger than the gain of the seed light in the CW output operation, posing a risk of damage to the optical amplification section. In order to avoid this risk, it is preferable to lower the pump input power down to such a predetermined power threshold level as to avoid breakage of the amplification fiber. If it is desired to reduce influence of the high peak power value due to the transient response in the rising part (transition duration) of the CW operation state, it should be considered to reduce the accumulated pump power "in the period from the last pulse to input of CW light." For example, it is conceivable to set the time from the last pulse to the CW light input short or to lower the pump power supplied at the time of the last pulse.

The pump power controller 50 may change the power of the pump light supplied to the amplification optical fiber 21, in one step or may change the power of the pump light supplied to the amplification optical fiber 21, stepwise in two or more stages. In the latter case, it is feasible to prevent an abrupt thermal change.

FIGS. 8A to 8D are timing charts showing an output operation example of the laser apparatus 1A according to the first embodiment. FIG. 8A shows a change of the external trigger voltage, FIG. 8B an operation pattern of the seed output according to the change of the external trigger voltage, FIG. 8C an operation pattern of the pump output according to the change of the external trigger voltage, and FIG. 8D an operation pattern of the output from the laser apparatus 1A according to the changes of FIGS. 8B and 8C.

In FIG. 8D, the laser output is the same as in FIG. 4D, in the CW1 instruction duration and the pulse instruction duration. The CW1 instruction duration is a duration in which the external trigger voltage is at the Low level as shown in FIG. 8A, and is coincident with the duration of the CW1 operation state to output the CW light with the power Pseed CW, in the seed light source 10 (FIG. 8B). The pulse instruction duration is a duration in which the external trigger voltage is at the High level as shown in FIG. 8A, and is coincident with the duration of the pulse operation state with the power Pseed Pulse (<Pseed CW), in the seed light source 10 (FIG. 8B).

A switch control duration of the CW2 instruction duration subsequent to the pulse instruction duration (cf. FIG. 8A) means a transition duration for switching the seed output from the repetitive pulse state to a rise to the CW operation (CW2 operation state), as shown in FIG. 8B. During this duration, the pump output transfers from the ON (output of the pump light at the power level P CW to maintain the steady state of CW operation or the repetitive pulse operation state) state to the Off (output of the pump light at a power level Pno damage CW for preventing occurrence of damage to the optical amplification section) state, as shown in FIG. 8C. As shown in FIG. 8D, the power level of the laser output during the CW1 instruction duration is Plaser CW and the power level of the pulse output during the pulse instruction duration subsequent to the CW1 instruction duration is Plaser pulse (>Plaser CW) including the power Plaser ASE.

This setup causes the laser output during the transition duration from the pulse operation to the CW operation to be lowered to a power level for preventing occurrence of damage to the optical amplification section (Plaser decreased Pulse as a power level of the pulse output during the switch control duration). After a lapse of the rise period (transition duration: CW2 transition to steady state) to the CW operation possibly causing damage to the optical amplification section, the pump power is returned to the ON state (output of the pump light at the power level P CW), moving into the CW2 steady state. It is understood that since the control of the laser apparatus 1A of the first embodiment is provided with the switch control duration at the beginning of the CW2 instruction duration subsequent to the pulse instruction duration to control the output of the pump light as described above, the laser light is always output with the laser power below that in the CW2 steady operation state, when compared to the operation example of the laser apparatus 1 of the comparative example shown in FIG. 4D.

As described above, the laser apparatus 1A of the first embodiment can perform a fast response on the occasions of performing the start and end of output of repetitive light pulses and can suppress the damage to the optical amplifying medium. Furthermore, it can decrease the time in which the current supplied to the pumping source 22 is set lower than the ordinary current value. For this reason, temperature stability of the pumping source 22 becomes better than by a method of starting or ending the output of the pumping source 22 to start/end the output of repetitive light pulses.

(Second Embodiment)

Figure 9:
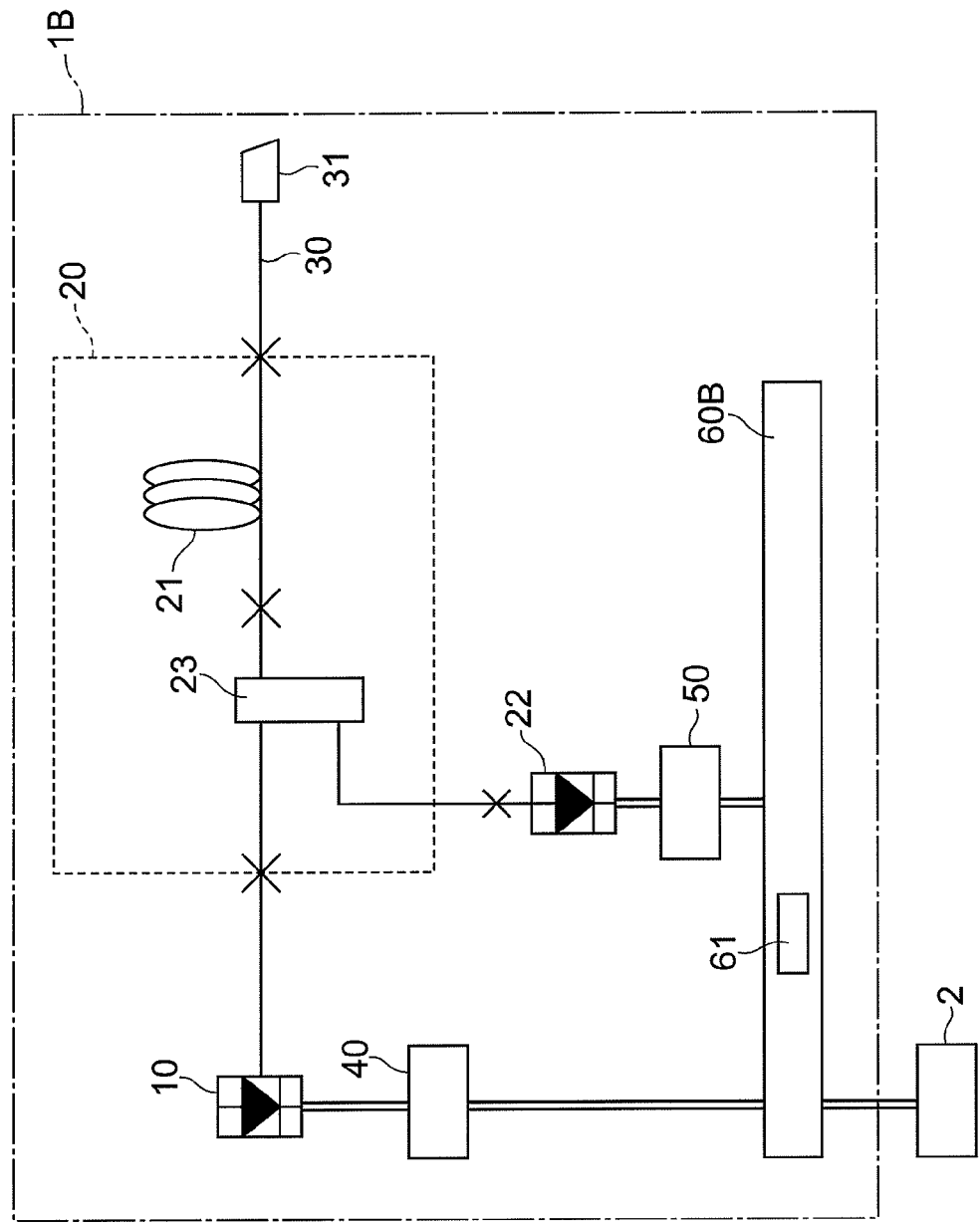
FIG. 9 is a drawing showing a configuration of the second embodiment of the laser apparatus according to the present invention.
Figure 10:
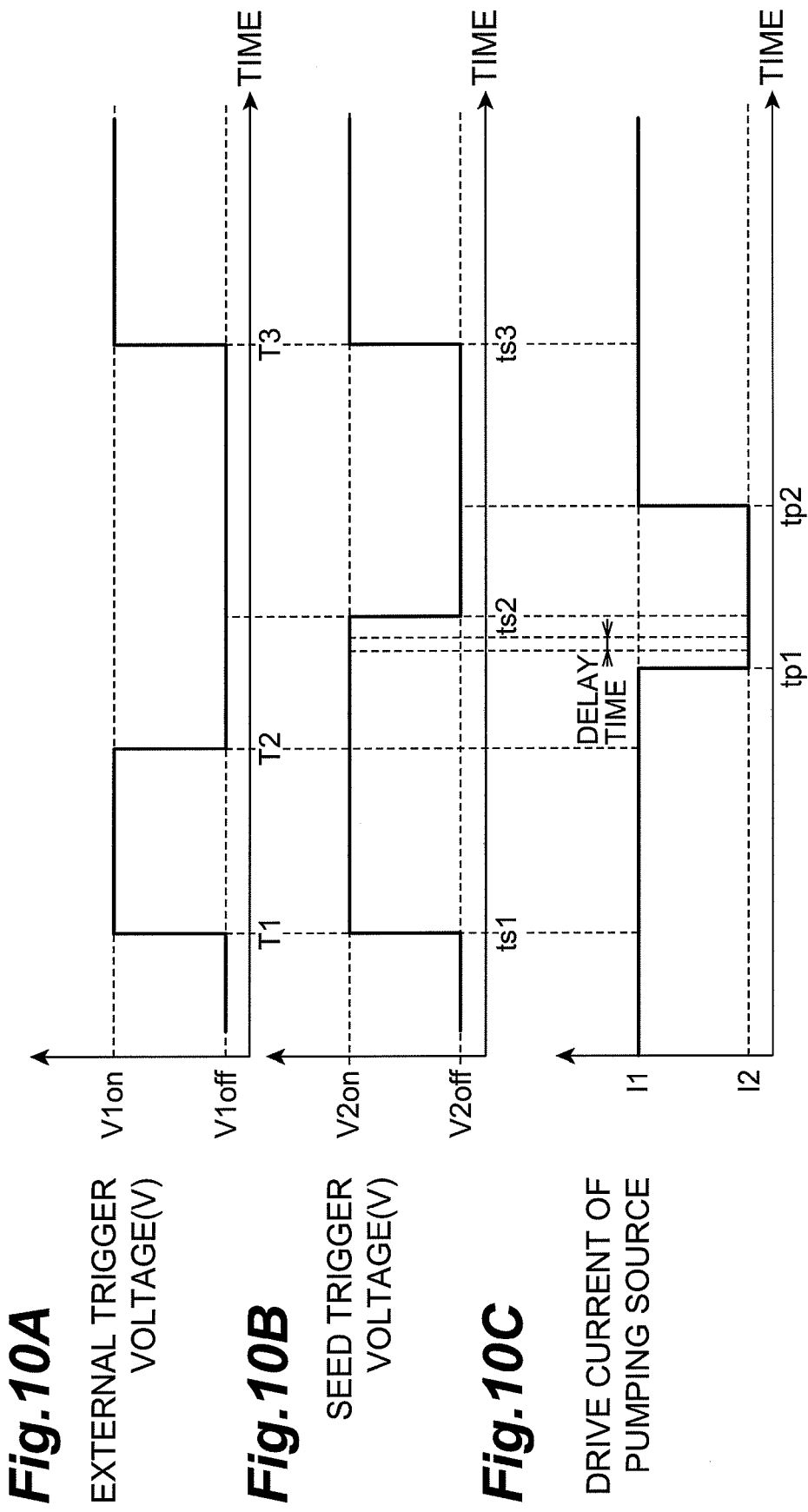
FIGS. 10A to 10C are timing charts showing respective signals in the laser apparatus 1B of the second embodiment.

FIG. 9 is a drawing showing a configuration of the laser apparatus 1B according to the second embodiment. FIGS. 10A to 10C are timing charts showing respective signals in the laser apparatus 1B of the second embodiment. The laser apparatus 1B shown in FIG. 9 is provided with the seed light source 10, the optical amplification section 20, the delivery optical fiber 30, the pulse modulator 40, the pump power controller 50, and a main controller 60B and is used in combination with the external trigger generator 2. When compared to the configuration of the laser apparatus 1A of the first embodiment shown in FIG. 5, the laser apparatus 1B of the second embodiment is different in comprising the main controller 60B instead of the main controller 60.

The main controller 60B includes a timing difference adjuster 61. The timing difference adjuster 61 sets a delay from a time when an instruction to lower the power of the pump light supplied to the amplification optical fiber 21 is sent to the pump power controller 50, to a time when an instruction to end the output of the seed light from the seed light source 10 is sent to the pulse modulator 40, on the occasion of ending the output of repetitive light pulses.

Namely, as shown in FIGS. 10A to 10C, the external trigger voltage fed to the main controller 60B turns from the Low level V1 off to the High level V1 on at the time T1 or T3. This causes the seed trigger voltage to turn from the Low level V2off to the High level V2on at the time ts1 or ts3 (to indicate a start of output of repetitive light pulses from the seed light source 10). Similarly, when the external trigger voltage turns from the High level V1on to the Low level V1off at the time T2, an end of the output of repetitive light pulses from the seed light source 10 is indicated at the time ts2 (to switch the seed trigger voltage from the High level V2on to the Low level V2off). Namely, the time ts1 and the time ts3 are set based on the time T1 and the time T3, respectively. With regard to the pump trigger signal, when the external trigger voltage turns from the High level V1on to the Low level V1off at the time T2, the drive current of the pumping source turns from the High level I1 to the Low level I2 at the time tp1 and further turns from the Low level I2 to the High level I1 at the time tp2 after a lapse of a short time from the time tp1. Namely, the time tp1 and the time tp2 are set based on the time T2. Therefore, the timing difference adjuster 61 sets the delay in a duration between the time tp1 and the time ts2.

The reason why it is preferred that the main controller 60B include the timing difference adjuster 61 as described above is as described below.

The target of the control of the pulse modulator 40 is the output of the seed light from the seed light source 10. Naturally, there is a time of propagation before the seed light output from the seed light source 10 enters the optical amplification section 20. On the other hand, the target of the control of the pump power controller 50 is the output of the pump light from the pumping source 22. A time is also necessary before a response after incidence of the pump light output from the pumping source 22 into the amplification optical fiber 21. Therefore, for adjusting the phases at the respective parts, the timing difference adjuster 61 sets a timing difference adjustment time, whereby the input timing of the pump power can be controlled more accurately.

(Third Embodiment)

Figure 11:
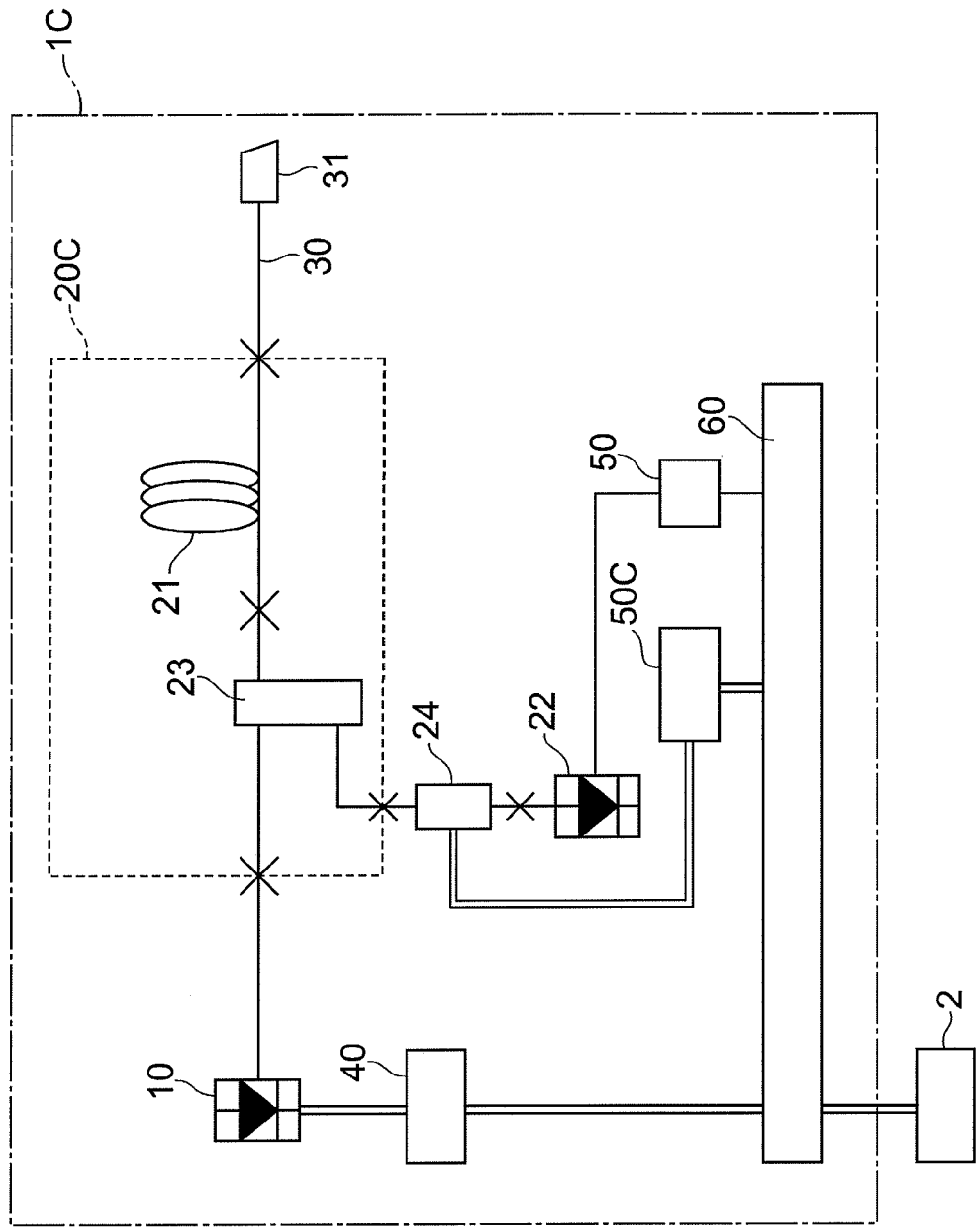
FIG. 11 is a drawing showing a configuration of the third embodiment of the laser apparatus according to the present invention.

FIG. 11 is a drawing showing a configuration of the laser apparatus 1C according to the third embodiment. The laser apparatus 1C of the third embodiment shown in FIG. 11 is provided with the seed light source 10, an optical amplification section 20C, the delivery optical fiber 30, the pulse modulator 40, the pump power controller 50, and the main controller 60 and is used in combination with the external trigger generator 2. When compared to the configuration of the laser apparatus 1A of the first embodiment shown in FIG. 5, this laser apparatus 1C of the third embodiment is different in comprising a variable optical attenuator 24 on the optical path between the optical amplification section 20C and the pumping source 22 and in comprising a pump power controller 50C to complement the pump power control with the pump power controller 50.

The pumping source 22 continuously outputs the pump light at a fixed intensity. The variable optical attenuator 24 is provided on the optical path of the pump light from the pumping source 22 to the amplification optical fiber 21 and an attenuation rate for the pump light is variable. The pump power controller 50C, receiving a control signal from the main controller 60, increases or decreases the attenuation rate of pump light in the variable optical attenuator 24, thereby increasing or decreasing the power of the pump light supplied to the amplification optical fiber 21. The laser apparatus 1C of the third embodiment can also achieve the same effect as the laser apparatus 1A of the first embodiment.

(Fourth Embodiment)

Figure 12:
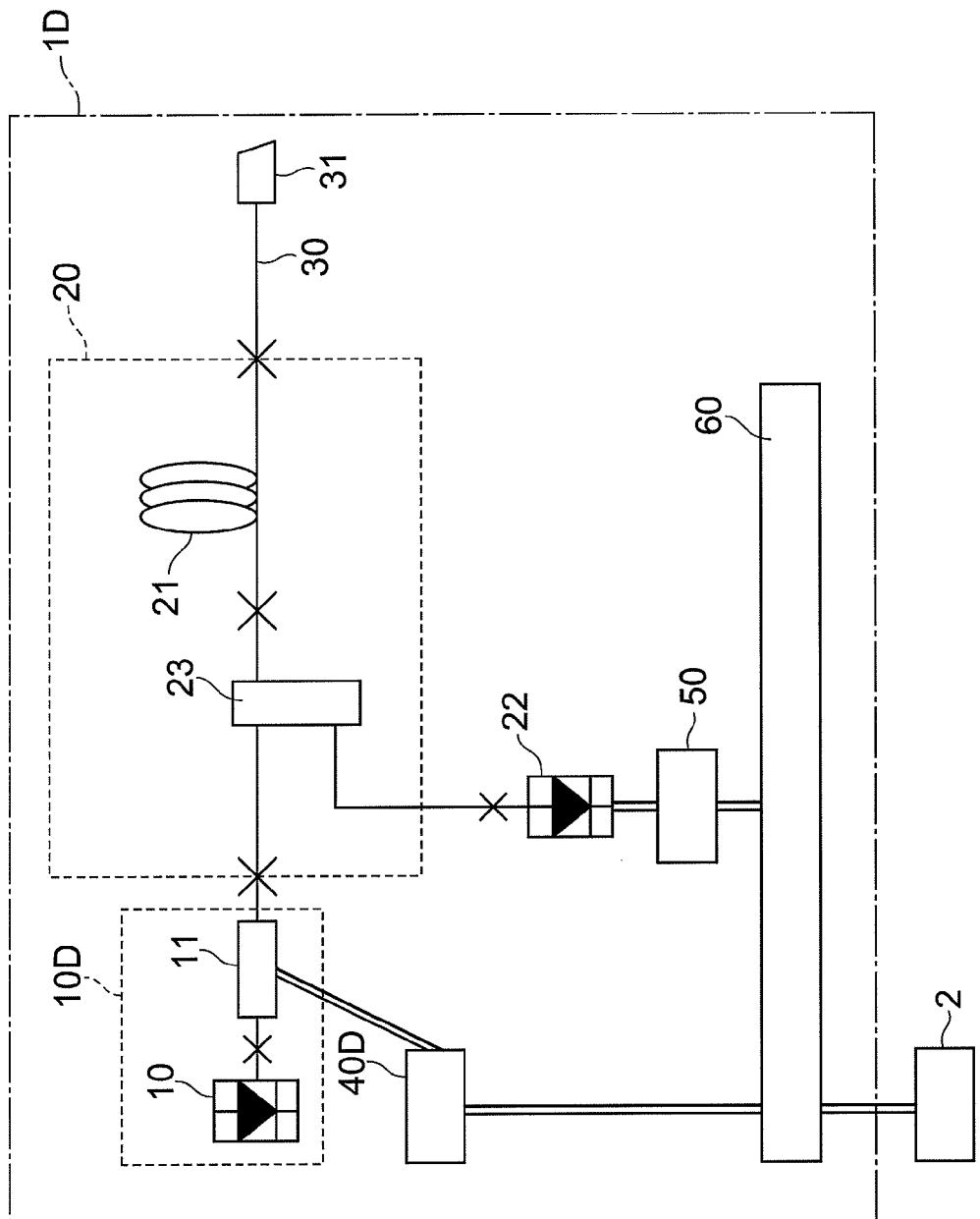
FIG. 12 is a drawing showing a configuration of the fourth embodiment of the laser apparatus according to the present invention.

FIG. 12 is a drawing showing a configuration of the laser apparatus 1D according to the fourth embodiment. The laser apparatus 1D of the fourth embodiment shown in FIG. 12 is provided with a seed light source 10D, the optical amplification section 20, the delivery optical fiber 30, a pulse modulator 40D, the pump power controller 50, and the main controller 60 and is used in combination with the external trigger generator 2. When compared to the configuration of the laser apparatus 1A of the first embodiment shown in FIG. 5, this laser apparatus 1D of the fourth embodiment is different in that the seed light source 10D further comprises an external modulator 11 in addition to the seed light source 10 and in that the pulse modulator 40D is provided instead of the pulse modulator 40. The seed light source 10D is configured as follows: the seed light source 10 performs the CW operation and the external modulator 11 turns the repetitive pulse operation state On/Off, thereby achieving alternate appearance of the CW operation state and the repetitive pulse operation state. The pulse modulator 40D controls only the repetitive pulse operation state of the external modulator 11. In the case of this configuration shown in FIG. 12, a rising part of the CW operation duration also appears and the problem of the transient response also occurs with an abrupt rise of the CW operation, raising a possibility of occurrence of an abrupt pulse peak. If the CW operation rises slow on the contrary, there is a possibility of occurrence of the problem of self pulsation of ASE light. Besides the configuration of FIG. 12, another possible form of use of the external modulator 11 is such that the seed light source is kept in the repetitive pulse operation state and the external modulator controls On/Off of the repetitive pulse operation state.

The seed light output at the fixed intensity from the seed light source 10 is modulated into pulsed light by the external modulator 11.

The external modulator 11 is given a seed trigger signal from the pulse modulator 40D and carries out a start and an end of output of pulsed seed light, based thereon. The laser apparatus 1D of the fourth embodiment can also achieve the same effect as the laser apparatus 1A of the first embodiment.

(Fifth Embodiment)

Figure 13:
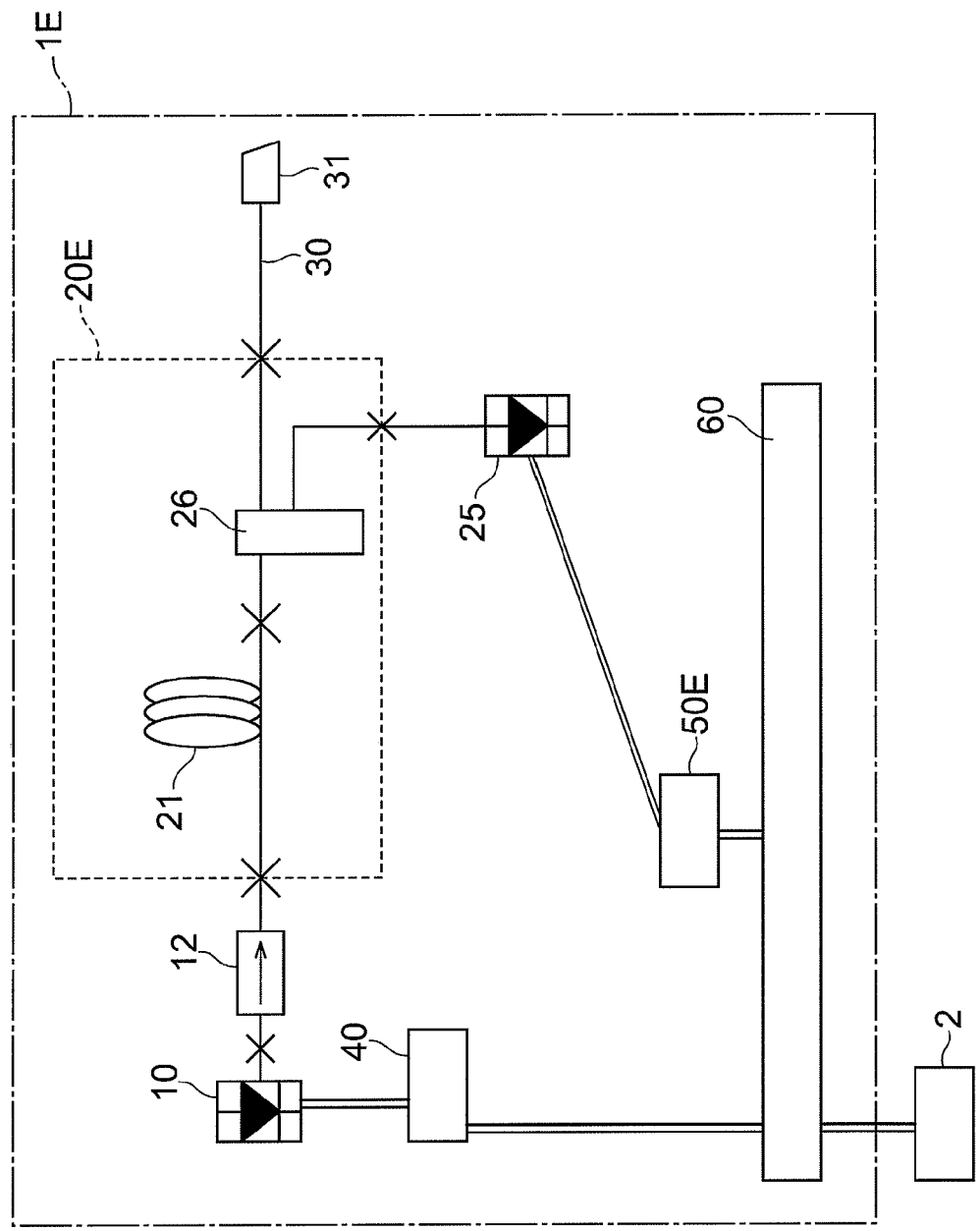
FIG. 13 is a drawing showing a configuration of the fifth embodiment of the laser apparatus according to the present invention.

FIG. 13 is a drawing showing a configuration of the laser apparatus 1E according to the fifth embodiment. The laser apparatus 1E of the fifth embodiment shown in FIG. 13 is provided with the seed light source 10, an optical isolator 12, an optical amplification section 20E, the delivery optical fiber 30, the pulse modulator 40, a pump power controller 50E, and the main controller 60 and is used in combination with the external trigger generator 2. When compared to the configuration of the laser apparatus 1A of the first embodiment shown in FIG. 5, this laser apparatus 1E of the fifth embodiment is different in further comprising the optical isolator 12, in comprising the optical amplification section 20E instead of the optical amplification section 20, and in comprising the pump power controller 50E instead of the pump power controller 50.

The optical isolator 12 is provided on the optical path of the seed light from the seed light source 10 to the optical amplification section 20E and functions to permit passage of light in the forward direction but inhibit passage of light in the backward direction.

The optical amplification section 20E includes the amplification optical fiber 21 as an optical amplifying medium, a pumping source 25, and an optical multiplexer 26. The pumping source 25 outputs pump light. The optical multiplexer 26 outputs repetitive light pulses output from the amplification optical fiber 21, into the delivery optical fiber 30 and receives the pump light output from the pumping source 25, to supply the pump light to the amplification optical fiber 21. The amplification optical fiber 21 is pumped by this pump light to optically amplify the seed light, and outputs repetitive light pulses after the optical amplification.

The pump power controller 50E, like the pump power controller 50 in the first embodiment, receives the pump trigger signal fed from the main controller 60 and, based on this pump trigger signal, it increases or decreases the power of the pump light output from the pumping source 25, thereby increasing or decreasing the power of the pump light supplied to the amplification optical fiber 21.

The optical amplification section 20 in the first embodiment was a forward pumping amplifier, whereas the optical amplification section 20E in this fifth embodiment is a backward pumping amplifier. The laser apparatus 1E of the fifth embodiment can also achieve the same effect as the laser apparatus 1A of the first embodiment.

(Sixth Embodiment)

Figure 14:
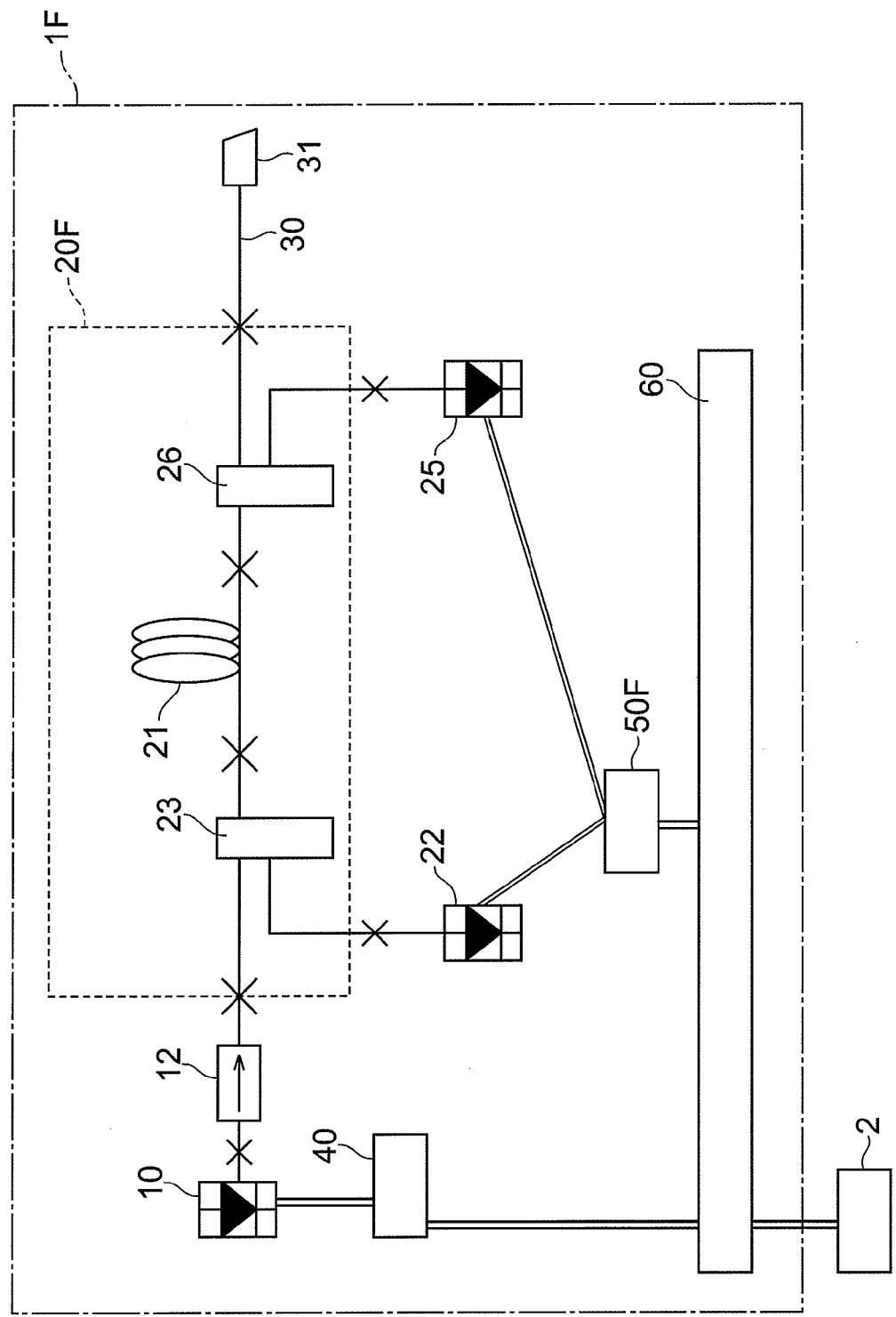
FIG. 14 is a drawing showing a configuration of the sixth embodiment of the laser apparatus according to the present invention.

FIG. 14 is a drawing showing a configuration of the laser apparatus 1F according to the sixth embodiment. The laser apparatus 1F of the sixth embodiment shown in FIG. 14 is provided with the seed light source 10, the optical isolator 12, an optical amplification section 20F, the delivery optical fiber 30, the pulse modulator 40, a pump power controller 50F, and the main controller 60 and is used in combination with the external trigger generator 2. When compared to the configuration of the laser apparatus 1A of the first embodiment shown in FIG. 5, this laser apparatus 1F of the sixth embodiment is different in further comprising the optical isolator 12, in comprising the optical amplification section 20F instead of the optical amplification section 20, and in comprising the pump power controller 50F instead of the pump power controller 50.

The optical isolator 12 is provided on the optical path of the seed light from the seed light source 10 to the optical amplification section 20F and functions to permit passage of light in the forward direction but inhibit passage of light in the backward direction.

The optical amplification section 20F includes the amplification optical fiber 21 as an optical amplifying medium, the pumping source 22, the optical multiplexer 23, a pumping source 25, and an optical multiplexer 26. Each of the pumping sources 22, 25 outputs pump light. The optical multiplexer 23 receives the seed light output from the seed light source 10 and outputs the seed light into the amplification optical fiber 21, and the optical multiplexer 23 receives the pump light output from the pumping source 22 and supplies the pump light into the amplification optical fiber 21. The optical multiplexer 26 outputs repetitive light pulses output from the amplification optical fiber 21 into the delivery optical fiber 30, and it receives the pump light output from the pumping source 25 and supplies the pump light into the amplification optical fiber 21. The amplification optical fiber 21 is pumped by these pump light beams to optically amplify the seed light, and outputs repetitive light pulses after the optical amplification.

The pump power controller 50F, like the pump power controller 50 in the first embodiment, receives the pump trigger signal fed from the main controller 60 and, based on this pump trigger signal, it increases or decreases the powers of the pump light beams output from the respective pumping sources 22, 25, thereby increasing or decreasing the powers of the pump light beams supplied to the amplification optical fiber 21.

The optical amplification section 20 in the first embodiment was the forward pumping amplifier and the optical amplification section 20E in the fifth embodiment was the backward pumping amplifier; whereas the optical amplification section 20F in this sixth embodiment is a bidirectional pumping amplifier. The laser apparatus 1F of the sixth embodiment can also achieve the same effect as the laser apparatus 1A of the first embodiment.

As described above, the laser apparatus according to the present invention realized the fast response in execution of the start and end of output of pulsed laser light, while effectively suppressing the damage to the optical amplifying medium.

What is claimed is:

1. A laser apparatus comprising:
a seed light source capable of outputting pulsed light as seed light;
a pumping source which outputs CW light as pump light;
an optical amplification section which receives the pump light and the seed light and amplifies the seed light;
a pulse modulator which modulates the seed light source into an operation state of either a repetitive pulse operation state or a CW operation state;
a pump power controller which adjusts a power of the pump light fed to the optical amplification section; and
a main controller which outputs a signal to indicate a timing of control in the pulse modulator and the pump power controller,
wherein, based on a timing of the signal output from the main controller, the pump power controller decreases the power of the pump light output from the pumping source to below a predetermined power in a duration in which the pulse modulator maintains the seed light source in the repetitive pulse operation state, prior to a switching timing of the seed light from the pulsed light to CW light at a light entrance end of the optical amplification section.

2. The laser apparatus according to claim 1, wherein the pump power controller controls an output power of the pumping source.

3. The laser apparatus according to claim 1, further comprising:
a variable optical attenuator arranged on an optical path between the pumping source and the optical amplification section,
wherein the pump power controller controls the variable optical attenuator.

4. The laser apparatus according to claim 1, wherein the predetermined power is a pump power at which a gain of ASE light in the optical amplification section becomes less than a gain of the CW light.

5. The laser apparatus according to claim 1, wherein the main controller comprises a timing difference adjuster for adjusting a timing difference so as to inject the pump light at the predetermined power, on the occasion of input of a rising part of the CW light of the seed light into the optical amplification section.

6. The laser apparatus according to claim 1, wherein the pump power is set stepwise toward a power in a CW oscillation operation, after reaching the predetermined power.

7. The laser apparatus according to claim 1, wherein the main controller includes the pump power controller.

* * * * *